United States Patent
Irving et al.

(10) Patent No.: US 10,605,691 B2
(45) Date of Patent: Mar. 31, 2020

(54) SYSTEM AND METHOD FOR TESTING HIGH PRESSURE FLUID CONTROL PRODUCTS

(71) Applicant: Caterpillar Inc., Peoria, IL (US)

(72) Inventors: Mark Alan Irving, Oklahoma, OK (US); Jimmy Carl Robertson, Sulphur, OK (US)

(73) Assignee: Caterpillar Inc., Peoria, IL (US)

( * ) Notice: Subject to any disclaimer, the term of this patent is extended or adjusted under 35 U.S.C. 154(b) by 256 days.

(21) Appl. No.: 15/700,730

(22) Filed: Sep. 11, 2017

(65) Prior Publication Data
US 2019/0078962 A1    Mar. 14, 2019

(51) Int. Cl.
*G01M 3/28* (2006.01)
*G01D 11/30* (2006.01)
*F15B 19/00* (2006.01)
*E21B 47/10* (2012.01)

(52) U.S. Cl.
CPC ....... *G01M 3/2807* (2013.01); *E21B 47/1025* (2013.01); *F15B 19/005* (2013.01); *G01D 11/30* (2013.01); *G01M 3/2853* (2013.01)

(58) Field of Classification Search
CPC .... G01M 3/28; G01M 3/2807; G01M 3/2853; G01D 11/30; F15B 19/00; F15B 19/005; E21B 47/1025
USPC ....... 73/49.5, 118.01, 152.01, 152.51, 865.6, 73/865.9
See application file for complete search history.

(56) References Cited

U.S. PATENT DOCUMENTS

| | | | |
|---|---|---|---|
| 3,926,036 A * | 12/1975 | Bower | G01M 3/02 73/37 |
| 4,823,882 A | 4/1989 | Stokley et al. | |
| 4,893,678 A | 2/1990 | Stokley et al. | |
| 5,092,162 A * | 3/1992 | Self | G01M 3/2815 73/49.5 |
| 5,559,281 A * | 9/1996 | McKay | B60T 17/228 73/121 |
| 6,981,422 B1 * | 1/2006 | Comardo | B01J 8/06 73/756 |
| 7,603,296 B2 | 10/2009 | Whiteley et al. | |
| 7,861,766 B2 | 2/2011 | McKee et al. | |
| 8,485,266 B2 | 7/2013 | Stautzenberger et al. | |

(Continued)

FOREIGN PATENT DOCUMENTS

JP    2018009888 A    1/2018
WO    2016028436 A    2/2016

Primary Examiner — Benjamin R Schmitt
(74) Attorney, Agent, or Firm — Brannon Sowers & Cracraft

(57) ABSTRACT

A testing system for testing high pressure fluid control products includes a testing chamber having a testing configuration in which an access door is in a closed position and contents of the testing chamber are contained for testing. The testing chamber includes a designated fitting testing area and a designated pipe testing area in fluid communication via an access window. The testing system also includes a set of interchangeable quick connect fixtures having similarly sized base ends and differently sized attachment ends. The designated fitting testing area includes a fitting test bench supporting at least one quick connect fixture for testing high pressure fittings, and the designated pipe testing area includes a pipe test bench supporting at least one quick connect fixture for testing high pressure pipes.

20 Claims, 7 Drawing Sheets

(56) References Cited

U.S. PATENT DOCUMENTS

| | | |
|---|---|---|
| 8,985,156 B2 | 3/2015 | Drouin et al. |
| 9,395,287 B2 | 7/2016 | White et al. |
| 9,410,422 B2 | 8/2016 | Sondhi |
| 9,574,403 B2 | 2/2017 | Ferrari |
| 10,082,005 B2 | 9/2018 | Salomonsen et al. |
| 2013/0192345 A1* | 8/2013 | Mateo .................... G01M 3/28 73/39 |
| 2015/0136422 A1 | 5/2015 | Rodgers |
| 2016/0130897 A1 | 5/2016 | Machocki |
| 2016/0245024 A1 | 8/2016 | Nicholson |
| 2017/0058645 A1 | 3/2017 | Hunter |

\* cited by examiner

SYSTEM AND METHOD FOR TESTING HIGH PRESSURE FLUID CONTROL PRODUCTS

TECHNICAL FIELD

The present disclosure relates generally to oil and gas production and, more particularly to testing of equipment, including high pressure fluid control products, used in oil and gas production.

BACKGROUND

The production of oil and gas requires specialized well equipment, including high pressure fluid control products. High pressure fluid control products may include pipes, valves, joints, fittings, and the like, which are operated under harsh conditions. Due to the harsh operating conditions, and various other factors, the well equipment may be susceptible to rapid wear and/or failure. If and/or when the well equipment does fail, the impact of the failure can be disastrous. For example, a failure can result in significant downtime, which can be costly in both repairs and lost revenue. To reduce the likelihood and impact of failure, the high pressure fluid control products may be periodically inspected, tested, and/or certified/re-certified.

U.S. Patent Application Publication No. 2017/0058645 to Hunter discloses a system and method for testing and certifying oil and gas equipment. More particularly, the Hunter reference is directed to a computer-implemented method for identifying a well equipment device component, a device test specification, and testing sequences to be performed by a testing apparatus. The system controls the testing apparatus for a particular test sequence so that the sequence is performed responsive to the device test specification. Testing data for the test sequence is generated and linked to the device so that a certificate can be generated.

SUMMARY OF THE INVENTION

In one aspect, a testing system for testing high pressure fluid control products includes a testing chamber having a testing configuration in which an access door of the testing chamber is in a closed position and contents of the testing chamber are contained for testing. The testing chamber includes a designated fitting testing area and a designated pipe testing area in fluid communication via an access window. The testing system also includes a set of interchangeable quick connect fixtures having similarly sized base ends and differently sized attachment ends. The designated fitting testing area includes a fitting test bench supporting at least one quick connect fixture of the set of interchangeable quick connect fixtures at the base end thereof for testing high pressure fittings, and the designated pipe testing area includes a pipe test bench supporting at least one quick connect fixture of the set of interchangeable quick connect fixtures at the base end thereof for testing high pressure pipes.

In another aspect, a mobile testing system for testing high pressure fluid control products includes a testing chamber mounted on a vehicle having a frame supporting ground-engaging elements. The testing chamber includes a designated fitting testing area and a designated pipe testing area in fluid communication via an access window. The mobile testing system also includes a set of interchangeable quick connect fixtures having similarly sized base ends and differently sized attachment ends. The designated fitting testing area includes a fitting test bench supporting at least one quick connect fixture of the set of interchangeable quick connect fixtures at the base end thereof for testing high pressure fittings. The designated pipe testing area includes a pipe test bench supporting at least one quick connect fixture of the set of interchangeable quick connect fixtures at the base end thereof for testing high pressure pipes.

In yet another aspect, a method of testing high pressure fluid control products using a mobile testing system includes a step of transporting the mobile testing system to a site. The mobile testing system includes a testing chamber mounted on a vehicle having ground engaging elements. The testing chamber includes a designated fitting testing area and a designated pipe testing area in fluid communication via an access window. The method also includes coupling a first high pressure fitting or a first high pressure pipe to a first quick connect fixture of the set of interchangeable quick connect fixtures. The first quick connect fixture is supported on one of a fitting test bench in the designated fitting testing area or a pipe test bench in the designated pipe testing area. The method includes additional steps of performing a test on the first high pressure fitting or the first high pressure pipe, decoupling the first high pressure fitting or the first high pressure pipe from the first quick connect fixture, and replacing the first quick connect fixture with a second quick connect fixture of the set of interchangeable quick connect fixtures. The first quick connect fixture and the second quick connect fixture have similarly sized base ends and differently sized attachment ends. Next, a second high pressure fitting or a second high pressure pipe is coupled to the second quick connect fixture, and a test is performed on the second high pressure fitting or the second high pressure pipe.

Other features and aspects will be apparent from the following description and accompanying drawings.

DETAILED DESCRIPTION

Figure 1:
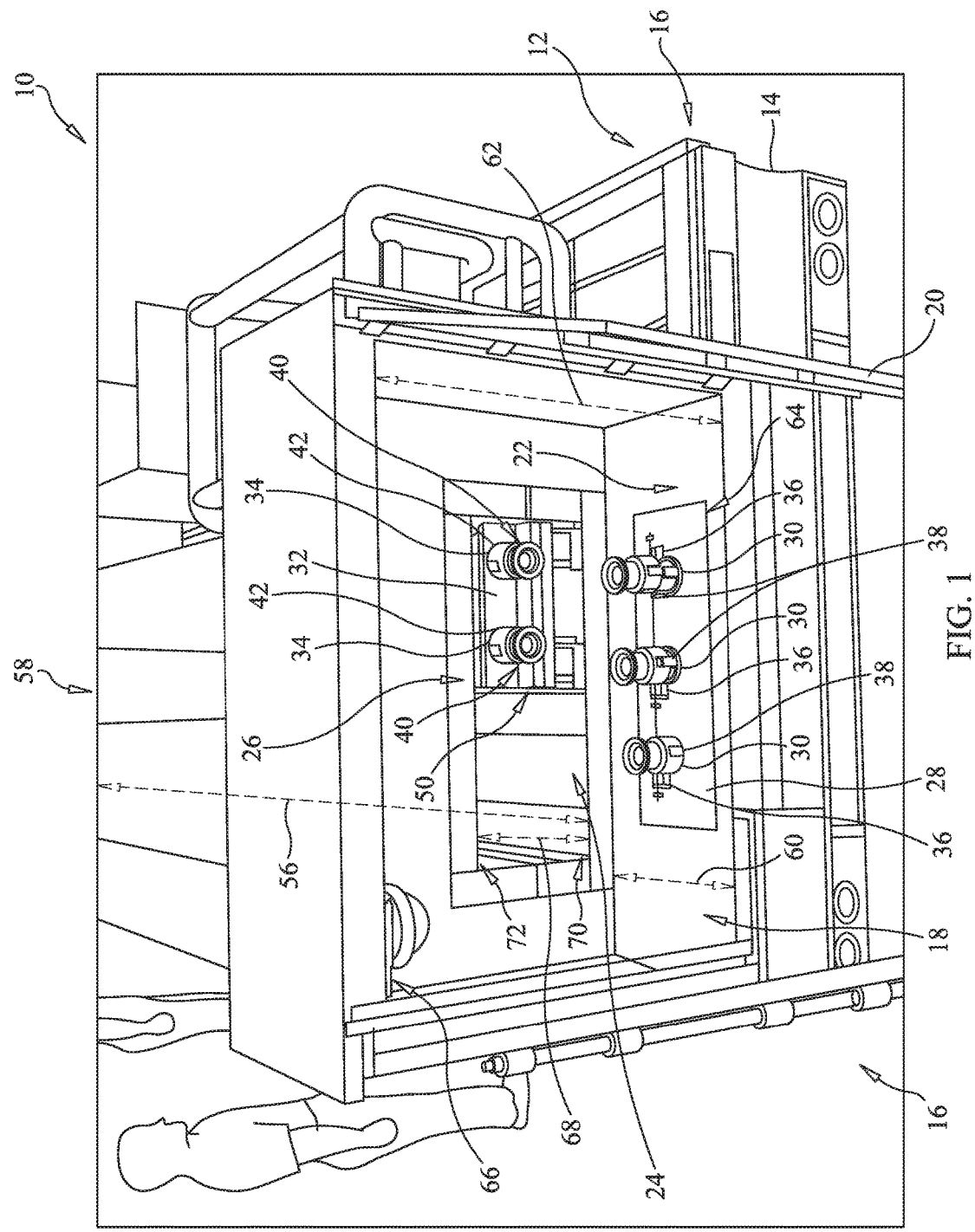
FIG. 1 is a perspective view of an exemplary testing system, according to the present disclosure.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

An exemplary testing system 10 for testing high pressure fluid control products is shown generally in FIG. 1. The testing system 10 may be applicable to a variety of different parts used in a variety of different industries, including the oil and gas industries. The testing system 10 may include a vehicle 12, such as, for example, a trailer, having a frame 14 that supports ground-engaging elements 16, such as wheels, with the testing system 10 and/or components thereof mounted on or integral with the frame 14. That is, the testing system 10, and/or components thereof, may be attached to and/or movable with the vehicle 12. As such, and regardless of whether the vehicle 12 is self-propelled, the testing system 10 may also be referred to as a mobile testing system, capable of being transported to and from different locations or sites, with testing being performed while the testing system 10 remains in position on the vehicle 12.

The testing system 10 includes a testing chamber 18, or enclosable testing space, having a testing configuration in which an access door 20 of the testing chamber 18 is in a closed position and contents of the testing chamber 18 are contained for testing. The testing chamber 18 includes a designated fitting testing area 22 and a designated pipe testing area 24 in fluid communication via an access window 26. Hydrostatic tests may be performed on any one or more high pressure fluid control products in the testing chamber 18. According to some embodiments, the tests may ensure and/or certify that the high pressure fluid control products perform as rated, or as otherwise expected. The testing chamber 18 may be constructed and/or configured based at least in part on safety requirements or concerns with regard to the tests being performed.

The designated fitting testing area 22 may include a fitting test bench 28 supporting at least one test fixture 30 for testing high pressure fittings, and the designated pipe testing area 24 may include a pipe test bench 32 supporting at least one test fixture 34 for testing high pressure pipes. Each of the designated fitting testing area 22 and the designated pipe testing area 24 may be sized, shaped, and configured to perform predetermined tests on select parts. According to some embodiments, the fitting test bench 28 and the pipe test bench 32 may each support a plurality of quick connect fixtures 34 or, more particularly, base ends of the quick connect fixtures 34. Quick connect fixtures 34 may provide for fast fluid connections by hand and, thus, reduce the need for additional fittings and/or tools for making the fluid connections.

The one or more test fixtures 30 for testing high pressure fittings may each be supported on and/or by the fitting test bench 28 at a vertical orientation, while the one or more test fixtures 34 for testing high pressure pipes may each be supported on and/or by the pipe test bench 32 at a horizontal orientation. "Vertical," as used herein, may refer to an orientation that is more vertical than horizontal, while "horizontal" may refer to an orientation that is more horizontal than vertical. Orientations may be selected based on a number of different factors related to loading/unloading, supporting, and/or testing the high pressure fluid control products.

As shown, the designated fitting testing area 22 may include three vertically oriented test fixtures 30 for testing high pressure fittings, and the designated pipe testing area 24 may include two horizontally oriented test fixtures 34 for testing high pressure pipes. Although a specific number of test fixtures 30, 34 is shown, a greater or lesser number of test fixtures 30, 34 may be used without deviating from the scope of the present disclosure.

As will be discussed below, the fitting test bench 28 may include locking mechanisms 36 for securing base ends 38 of the quick connect fixtures 30 for testing high pressure fittings, and the pipe test bench 32 may include locking mechanisms 40 for securing base ends 42 of the quick connect fixtures 34 for testing high pressure pipes. A variety of different locking mechanisms 36, 40 may be adapted for use with the testing system 10 of the present disclosure.

Figure 2:
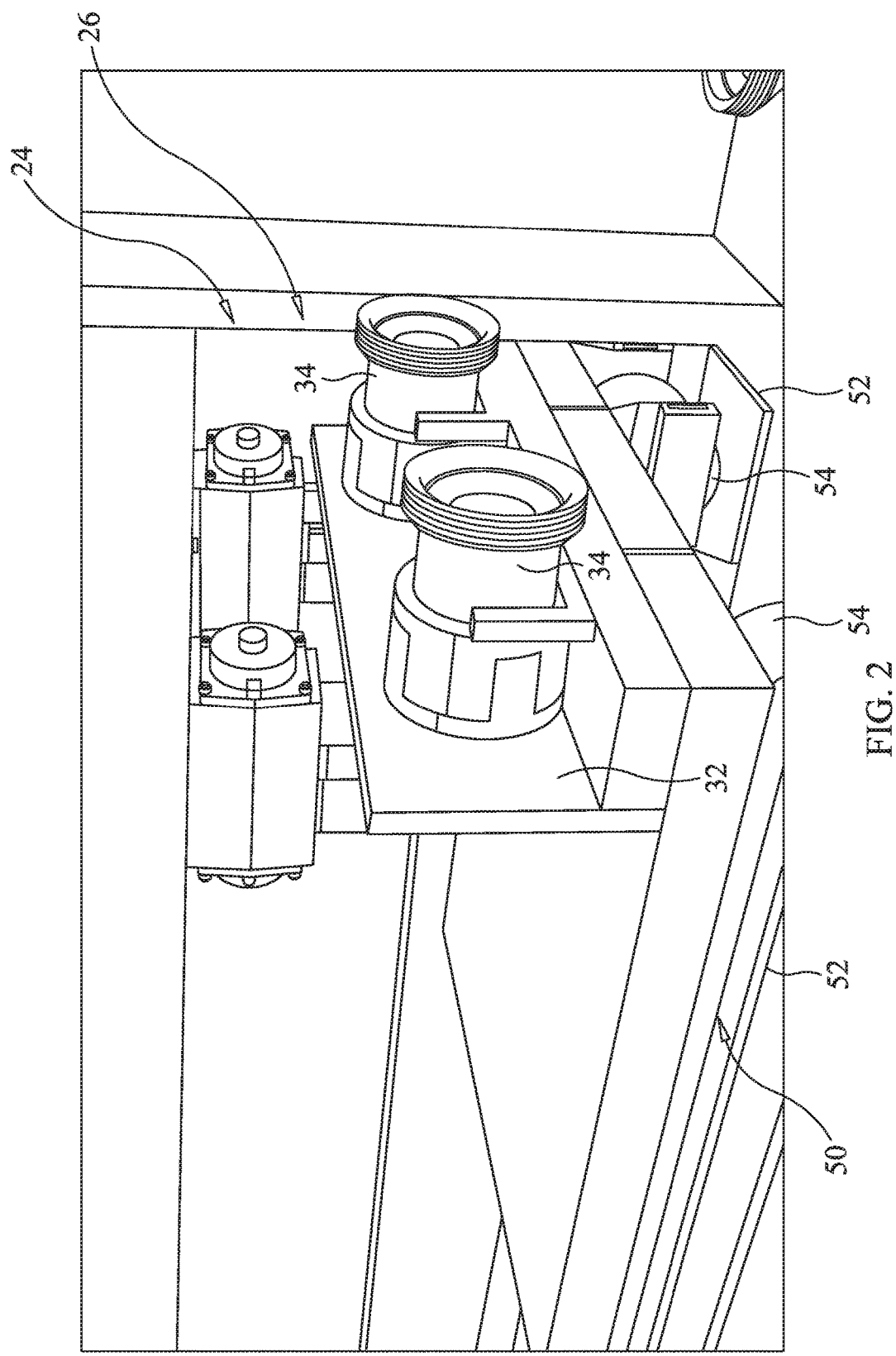
FIG. 2 is a perspective view of portions of a conveyor of the testing system of FIG. 1, according to an aspect of the present disclosure.

Turning now to FIG. 2, one or more conveyors 50 may be positioned within the designated pipe testing area 24 and may support the one or more test fixtures 34 for testing high pressure pipes. In particular, a length of conveyor track 52 may be provided in the designated pipe testing area 24 for receiving wheels 54 of the one or more conveyors 50. Each of the one or more conveyors 50 may be axially movable, along the length of conveyor track 52, within the designated pipe testing area 24 and between a load/unload position and a test position. For example, the one or more conveyors 50 may be movable toward and away from the access window 26, such as while one or more high pressure pipes are loaded and unloaded for testing.

With reference back to FIG. 1, a length 56 of the designated pipe testing area 24, measured from the access window 26 to an end 58 of the designated pipe testing area 24, may be greater than a length 60 of the designated fitting testing area 22, measured from the access window 26 to the access door 20. Additionally, or alternatively, a height 62 of the designated fitting testing area 22, measured from a floor 64 of the designated fitting testing area 22 to a ceiling 66 of the designated fitting testing area 22, may be greater than a height 68 of the designated pipe testing area 24, measured from a floor 70 of the designated pipe testing area 24 to a ceiling 72 of the designated pipe testing area 24. That is, for example, the designated fitting testing area 22 may be substantially vertical, while the designated pipe testing area 24 may be substantially horizontal.

Figure 3:
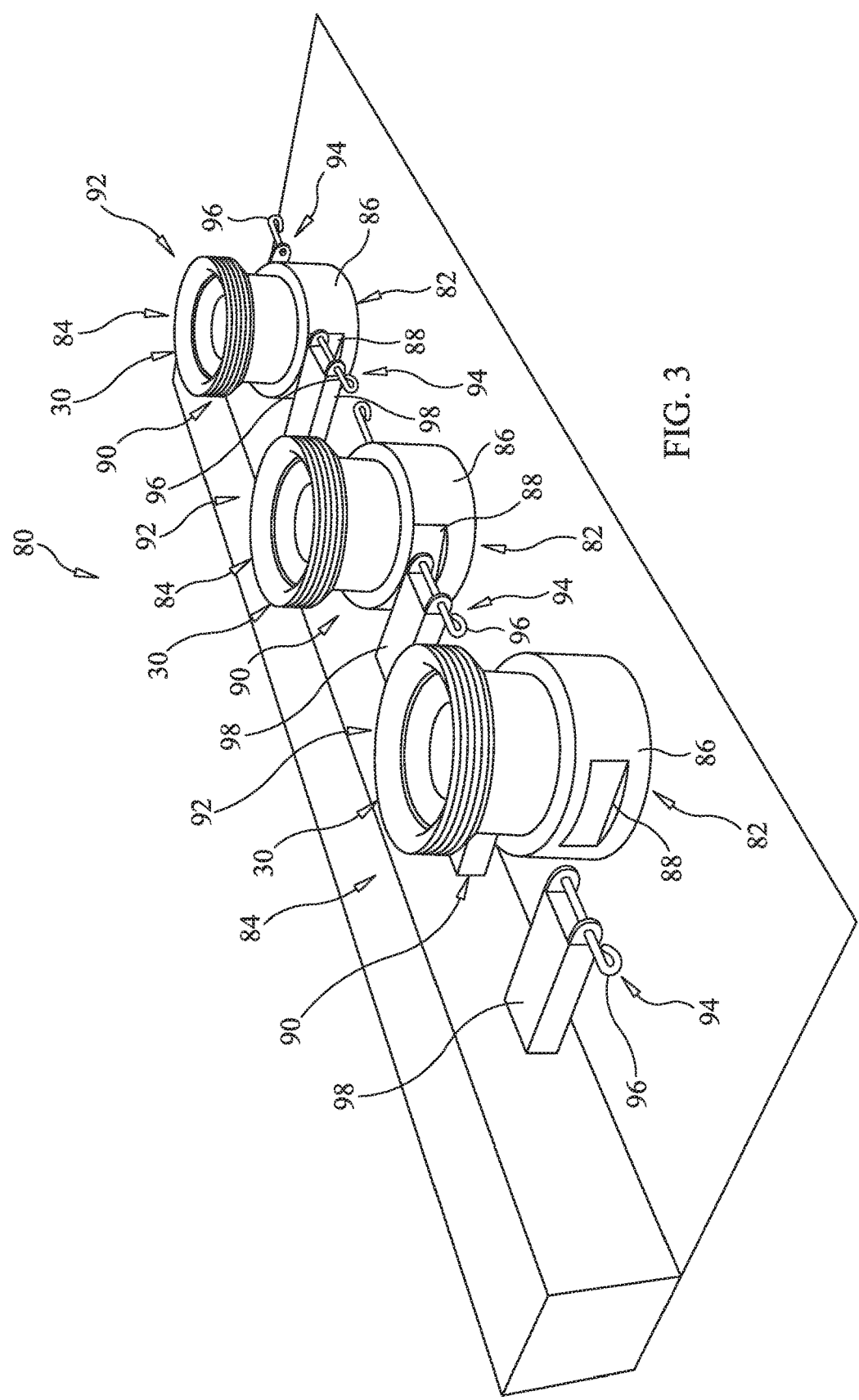
FIG. 3 is a first exemplary embodiment of interchangeable quick connect fixtures for use with the testing system of FIG. 1, according to an aspect of the present disclosure.

The testing system 10 may include or utilize a set of interchangeable quick connect fixtures 80 having similarly sized base ends 82 and differently sized attachment ends 84, as shown in FIG. 3. That is, the test fixtures 30 for testing high pressure fittings and the test fixtures 34 for testing high pressure pipes may be quick connect fixtures that are interchangeable to facilitate testing of high pressure fluid control products of different shapes and sizes. The base ends 82 may be similarly sized for interchangeable attachment to one of the fitting test bench 28 and the pipe test bench 32, while the attachment ends 84 may have various sizes to accommodate various different high pressure fluid control products.

According to some embodiments, each fixture 80 of the set of interchangeable quick connect fixtures 80 is a single unitary piece, or body, 86 having pin-receiving slots 88 on opposing sides 90, 92 thereof, with a locking mechanism 94 that includes at least one spring-loaded pin 96. As shown, the quick connect fixtures 80 may slide into position between guide posts 98 supporting the spring-loaded pins 96. An end of the spring-loaded pins 96 may engage the pin-receiving slots 88 to maintain relative positioning of the quick connect fixtures 80.

Figure 4:
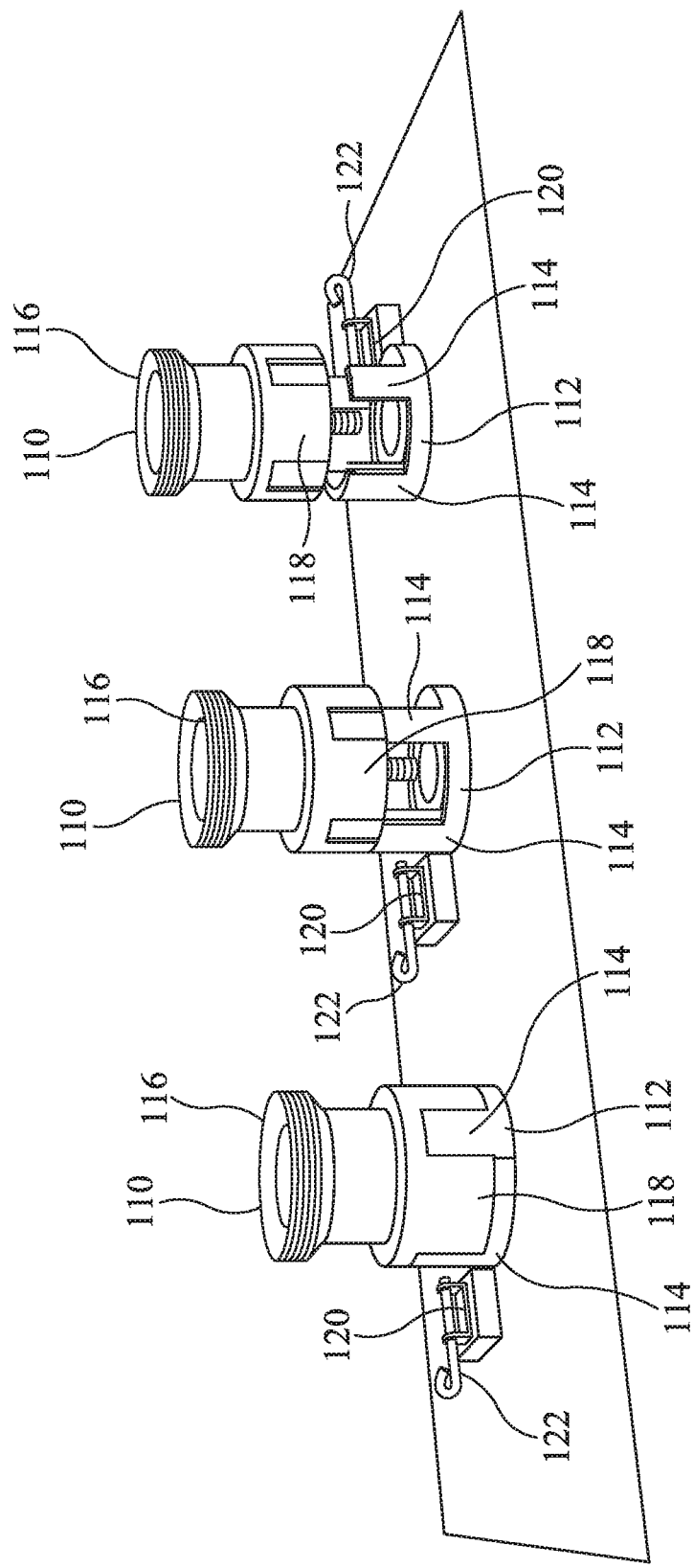
FIG. 4 is a second exemplary embodiment of interchangeable quick connect fixtures for use with the testing system of FIG. 1, according to another aspect of the present disclosure.
Figure 5:
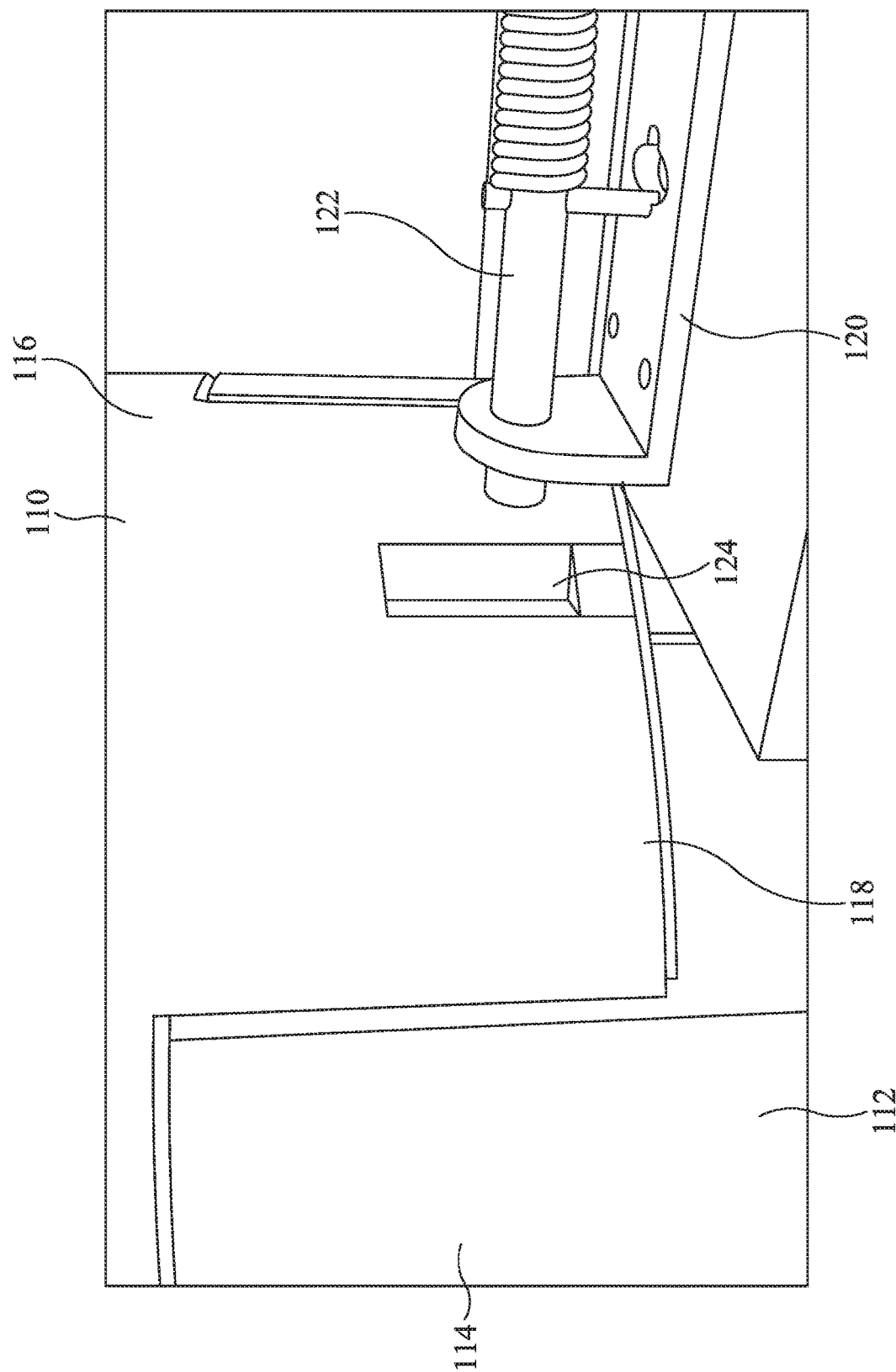
FIG. 5 is a perspective view of an exemplary locking mechanism for use with the interchangeable quick connect fixtures of FIG. 4, according to another aspect of the present disclosure.

Turning to FIG. 4, and according to other embodiments, each fixture 110 of a set of interchangeable quick connect fixtures 110 may include a crown-shaped base 112 having a plurality of upwardly extending tabs 114 spaced apart about a perimeter of the crown-shaped base 112, and a crown-shaped top 116 having a plurality of downwardly extending tabs 118 spaced about a perimeter of the crown-shaped base 112 such that the plurality of downwardly extending tabs 118 and the plurality of upwardly extending tabs 114 interlock. According to the current embodiment, a locking mechanism 120, as shown in greater detail in FIG. 5, for each fixture 110 may include at least one spring-loaded pin 122 configured for receipt within the at least one pin-receiving slot 124 of the crown-shaped top 116.

Figure 6:
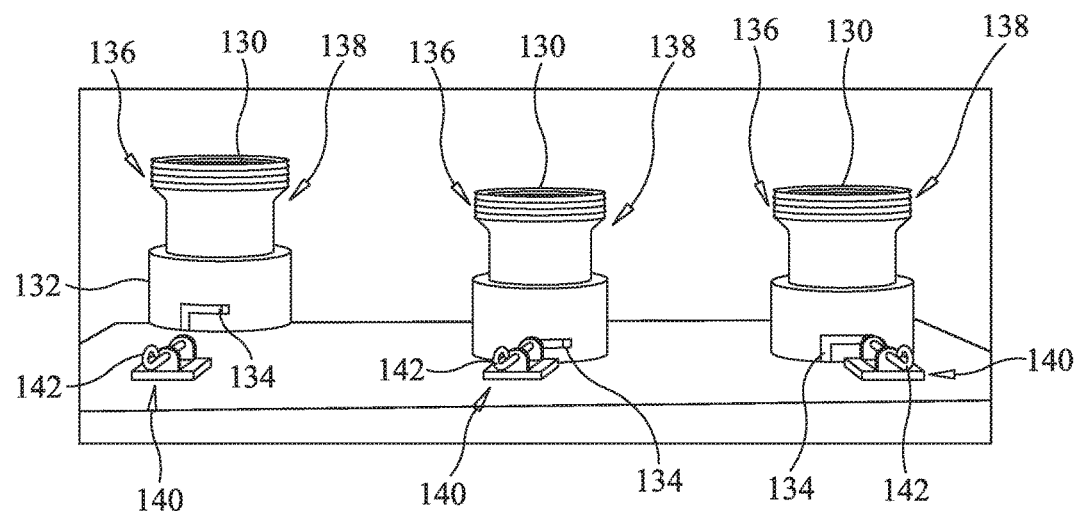
FIG. 6 is a third exemplary embodiment of interchangeable quick connect fixtures for use with the testing system of FIG. 1, according to another aspect of the present disclosure.
Figure 7:
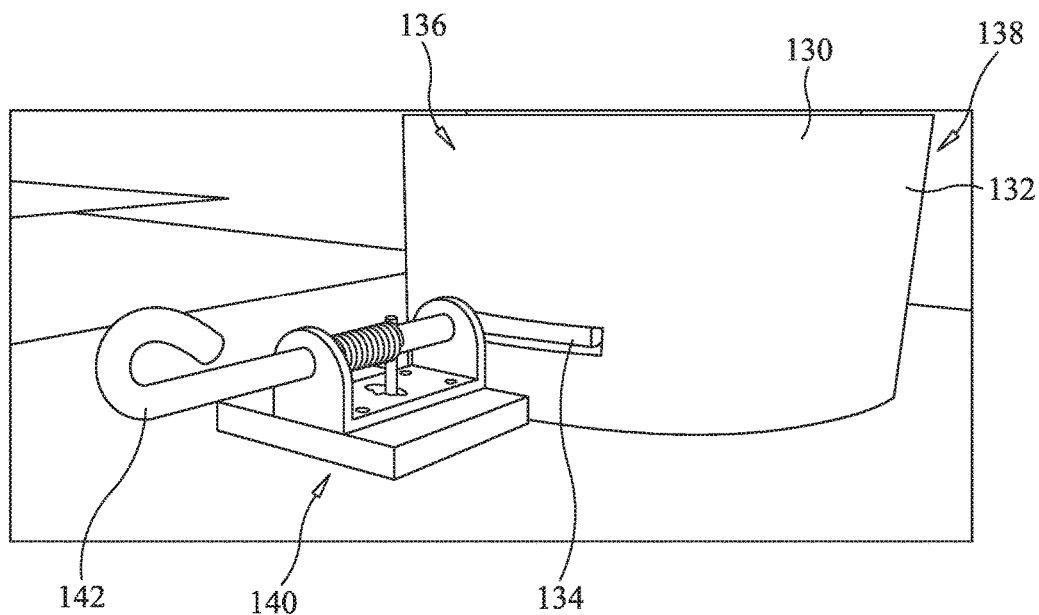
FIG. 7 is a perspective view of an exemplary locking mechanism for use with the interchangeable quick connect fixtures of FIG. 6, according to an aspect of the present disclosure.

According to yet another embodiment, as shown in FIGS. 6 and 7, each fixture 130 of a set of interchangeable quick connect fixtures 130 may include a single unitary piece, or body, 132 having L-shaped pin-receiving slots 134 on opposing sides 136, 138 thereof. A locking mechanism 140 may include at least one pin 142 for engaging one of the L-shaped pin-receiving slots 134.

Each of the embodiments presented or contemplated herein may include any one or more of a generator for providing power, a source of pressurized air, a source of pressurized water, and drainage. High pressure fittings, as used herein, may include at least one of a union, an integral fitting, a swivel joint, a hose loop, and a valve. High pressure pipes, as used herein, may include a pup joint, for example.

INDUSTRIAL APPLICABILITY

The present disclosure relates generally to oil and gas production and, more particularly, to the testing of equipment used in oil and gas production. Further, the present disclosure is applicable to a system and method for testing high pressure fluid control products, such as fittings and pipes, used in the oil and gas production industries.

Conventional testing of high pressure fluid control products and, more particularly, to the testing of high pressure fluid control pipes, such as pup joints, may require a large footprint, significant lifting and/or manipulation by multiple technicians, and long setup times per test. Testing may be required every six months, for example, with 1000+ fixtures being tested per site. The present disclosure is directed to an improved system and method of testing high pressure fluid control products.

An exemplary testing system 10 for testing high pressure fluid control products, according to the present disclosure, is shown generally in FIG. 1. The testing system 10 generally includes a testing chamber 18 housing a designated fitting testing area 22 and a designated pipe testing area 24. The designated fitting testing area 22 includes one or more test fixtures 30 for testing high pressure fittings, and the designated pipe testing area 24 includes one or more test fixtures 34 for testing high pressure pipes. The testing chamber 18 may also include one or more conveyors 50 positioned within the designated pipe testing area 24 and supporting the one or more test fixtures 34 for testing high pressure pipes, each of the one or more conveyors 50 being axially moveable within the designated pipe testing area 24 between a load/unload position and a test position.

Figure 8:
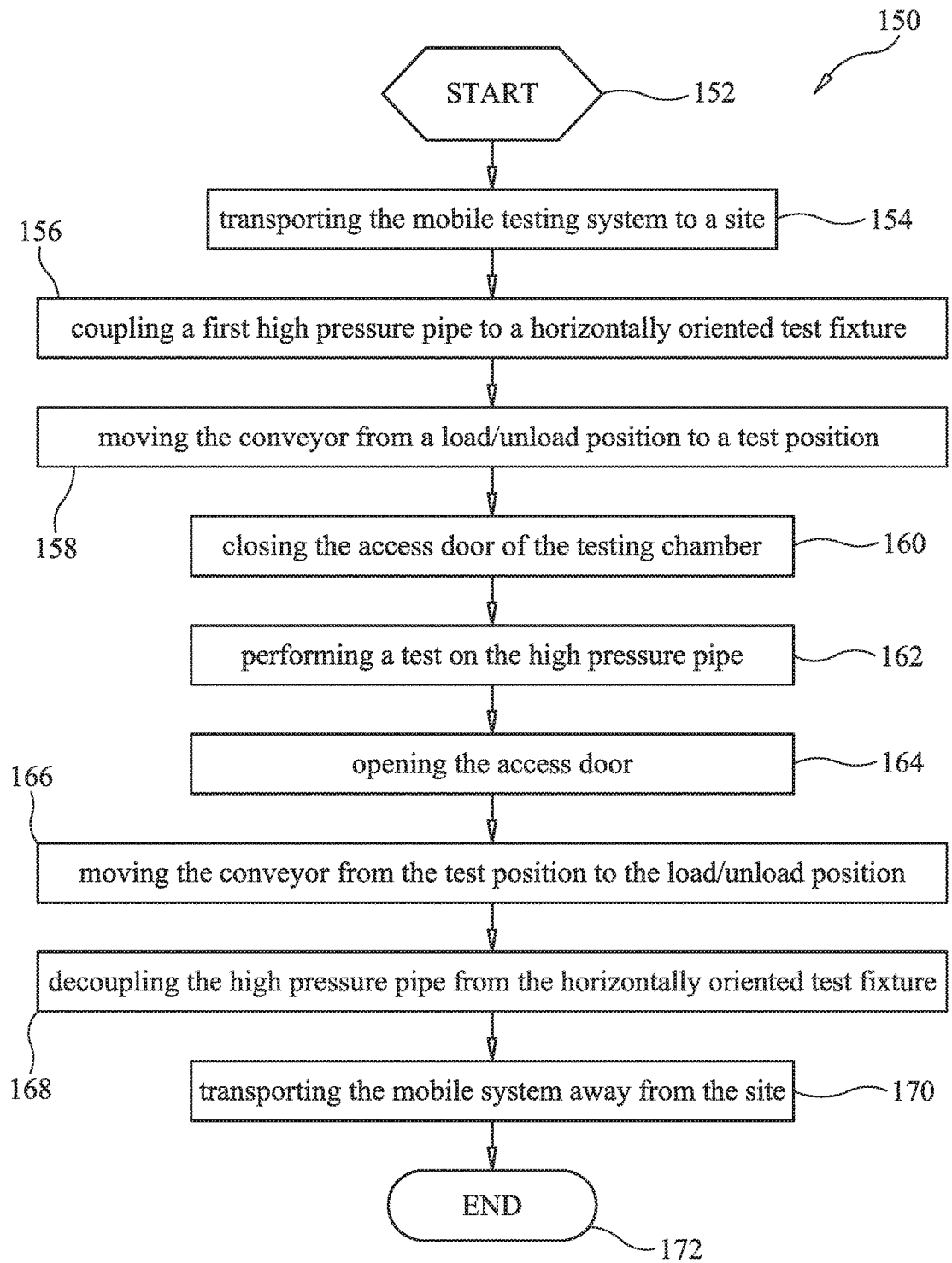
FIG. 8 is a flow diagram illustrating an exemplary method for testing high pressure fluid control products, according to an aspect of the present disclosure.

A method for testing high pressure fluid control products using the testing system 10 of the present disclosure is illustrated in a flow diagram 150 of FIG. 8. The method begins at a START, at box 152. At box 154, the testing system 10 (e.g., mobile testing system) is transported to a site to perform testing on high pressure fluid control products at the site. Next, at box 156, a first high pressure pipe is coupled to a horizontally oriented test fixture 34. With the first high pressure pipe coupled to the horizontally oriented test fixture 34, the conveyor 50 may be moved from a load/unload position at the access window 26 to a test position away from the access window 26 and within the designated pipe testing area 24 (box 158). The conveyor 50 may, thus, assist in lifting and maneuvering the first high pressure pipe into position for testing.

At box 160, the access door 20 of the testing system 10 may be closed. Thereafter, at box 162, a test may be performed on the first high pressure pipe. The blast containment rating for the testing chamber 18 is about 22,500 pounds per square inch (PSI). After testing, the access door 20 may be opened (at box 164). The conveyor 50 may then be moved from the test position to the load/unload position, at box 166, and the first high pressure pipe may be decoupled from the first horizontally oriented test fixture 34, at box 168. The mobile testing system 10 may then be transported away from the site (box 170), and the method proceeds to an END, at box 172.

The testing system 10 described herein may be used at various work sites, such as those in the oil and gas industries, for testing high pressure fluid control products. The testing system 10 is mobile and, thus, a separate footprint for a conventionally constructed test chamber is not required. The current testing system 10 also incorporates a conveyor 50 for loading particularly large or heavy high pressure fluid control products, such as pipes. Further, the testing system 10 includes quick connect fixtures 80, 110, and 130 for coupling high pressure fluid control products to appropriate locations within the testing chamber 18. Higher efficiencies may be achieved when connecting high pressure fluid control products to quick connect fixtures 80, 110, and 130, as compared to conventional designs that require the step of manually breaking hammer union connections and swapping out crossovers for appropriately sized crossovers. The use of interchangeable quick connect fixtures 80, 110, and 130 requires less equipment to mobilize and less capital expense.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A testing system for testing high pressure fluid control products, including:
   a testing chamber having a testing configuration in which an access door of the testing chamber is in a closed position and contents of the testing chamber are contained for testing, the testing chamber including a designated fitting testing area and a designated pipe testing area in fluid communication via an access window;
   a set of interchangeable quick connect fixtures having similarly sized base ends and differently sized attachment ends;
   the designated fitting testing area including a fitting test bench supporting at least one quick connect fixture of the set of interchangeable quick connect fixtures at the base end thereof for testing high pressure fittings; and
   the designated pipe testing area including a pipe test bench supporting at least one quick connect fixture of the set of interchangeable quick connect fixtures at the base end thereof for testing high pressure pipes.

2. The testing system of claim 1, further including a vehicle having a frame supporting ground-engaging elements, wherein the testing chamber is mounted on the frame.

3. The testing system of claim 2, wherein the high pressure fittings include at least one of an integral fitting, a swivel joint, a hose loop, and a valve, and wherein the high pressure pipes include a pup joint.

4. The testing system of claim 1, wherein the at least one quick connect fixture for testing high pressure fittings is supported at a vertical orientation, and the at least one quick connect fixture for testing high pressure pipes is supported at a horizontal orientation.

5. The testing system of claim 4, wherein the fitting test bench includes a locking mechanism for securing the base end of the at least one quick connect fixture for testing high pressure fittings, and the pipe test bench includes a locking mechanism for securing the base end of the at least one quick connect fixture for testing high pressure pipes.

6. The testing system of claim 5, wherein each quick connect fixture of the set of interchangeable quick connect fixtures is a single unitary piece having pin-receiving slots on opposing sides thereof, and wherein the locking mechanism includes two spring-loaded pins for engagement with the pin-receiving slots.

7. The testing system of claim 5, wherein each quick connect fixture of the set of interchangeable quick connect fixtures includes a crown-shaped base having a plurality of upwardly extending tabs spaced apart about a perimeter of the crown-shaped base, and a crown-shaped top having a plurality of downwardly extending tabs spaced about a perimeter of the crown-shaped base such that the plurality of downwardly extending tabs and the plurality of upwardly extending tabs interlock.

8. The testing system of claim 7, wherein the locking mechanism includes at least one spring-loaded pin configured for receipt within at least one pin-receiving slot of the crown-shaped top.

9. The testing system of claim 5, wherein each quick connect fixture of the set of interchangeable quick connect fixtures includes a single unitary piece having L-shaped pin-receiving slots on opposing sides thereof, and wherein the locking mechanism includes at least one pin.

10. The testing system of claim 1, further including:
a length of conveyor track provided within the designated pipe testing area; and
at least one conveyor movable along the length of conveyor track and supporting at least one quick connect fixture for testing high pressure pipes, each conveyor being axially movable along the length of conveyor track from a load/unload position to a test position.

11. The testing system of claim 10, wherein a length of the designated pipe testing area, measured from the access window to an end of the designated pipe testing area, is greater than a length of the designated fitting testing area, measured from the access window to the access door.

12. The testing system of claim 11, wherein a height of the designated fitting testing area, measured from a floor of the designated fitting testing area to a ceiling of the designated fitting testing area, is greater than a height of the designated pipe testing area, measured from a floor of the designated pipe testing area to a ceiling of the designated pipe testing area.

13. A mobile testing system for testing high pressure fluid control products, including:
a testing chamber mounted on a vehicle having a frame supporting ground-engaging elements, the testing chamber including a designated fitting testing area and a designated pipe testing area in fluid communication via an access window;
a set of interchangeable quick connect fixtures having similarly sized base ends and differently sized attachment ends;

the designated fitting testing area including a fitting test bench supporting at least one quick connect fixture of the set of interchangeable quick connect fixtures at the base end thereof for testing high pressure fittings; and
the designated pipe testing area including a pipe test bench supporting at least one quick connect fixture of the set of interchangeable quick connect fixtures at the base end thereof for testing high pressure pipes.

14. The mobile testing system of claim 13, further including:
a length of conveyor track provided within the designated pipe testing area; and
at least one conveyor movable along the length of conveyor track and supporting the one or more quick connect fixtures for testing high pressure pipes, each conveyor being axially movable along the length of conveyor track from a load/unload position to a test position.

15. The mobile testing system of claim 14, wherein the one or more quick connect fixtures for testing high pressure fittings are supported at a vertical orientation, and wherein the one or more quick connect fixtures for testing high pressure pipes are supported at a horizontal orientation.

16. The mobile testing system of claim 15, wherein the fitting test bench includes a locking mechanism for securing a position of the base end of the at least one quick connect fixture for testing high pressure fittings, and the pipe test bench includes a locking mechanism for securing a position of the base end of the at least one quick connect fixture for testing high pressure pipes.

17. A method of testing high pressure fluid control products using a mobile testing system, the method including steps of:
transporting the mobile testing system to a site, the mobile testing system including a testing chamber mounted on a vehicle having ground engaging elements, the testing chamber including a designated fitting testing area and a designated pipe testing area in fluid communication via an access window;
coupling a first high pressure fitting or a first high pressure pipe to a first quick connect fixture of the set of interchangeable quick connect fixtures, wherein the first quick connect fixture is supported on one of a fitting test bench in the designated fitting testing area or a pipe test bench in the designated pipe testing area;
performing a test on the first high pressure fitting or the first high pressure pipe;
decoupling the first high pressure fitting or the first high pressure pipe from the first quick connect fixture;
replacing the first quick connect fixture with a second quick connect fixture of the set of interchangeable quick connect fixtures, wherein the first quick connect fixture and the second quick connect fixture have similarly sized base ends and differently sized attachment ends;
coupling a second high pressure fitting or a second high pressure pipe to the second quick connect fixture; and
performing a test on the second high pressure fitting or the second high pressure pipe.

18. The method of claim 17, further including:
coupling the first high pressure pipe to the first quick connect fixture in the designated pipe testing area, wherein the first high pressure pipe has a horizontal orientation and is supported on a first conveyor; and
with the first high pressure pipe coupled to the first quick connect fixture, moving the first conveyor from a load/unload position at the access window to a test position away from the access window and within the designated pipe testing area.

19. The method of claim 18, further including:

coupling a third high pressure fitting to a third quick connect fixture in the designated fitting testing area, wherein the third high pressure fitting has a vertical orientation; and performing a test on the third high pressure fitting and the first high pressure pipe simultaneously.

20. The method of claim 18, further including:

coupling a fourth high pressure pipe to a fourth quick connect fixture in the designated pipe testing area; and performing a test on the fourth high pressure pipe and the first high pressure pipe simultaneously.

\* \* \* \* \*